(12) United States Patent
Circosta

(10) Patent No.: US 11,020,934 B2
(45) Date of Patent: Jun. 1, 2021

(54) DECORATION BY SUBLIMATION TRANSFER SHEET

(71) Applicant: Can't Live Without It, LLC, New York, NY (US)

(72) Inventor: Michael Circosta, Brooklyn, NY (US)

(73) Assignee: CAN'T LIVE WITHOUT IT, LLC, New York, NY (US)

( * ) Notice: Subject to any disclaimer, the term of this patent is extended or adjusted under 35 U.S.C. 154(b) by 0 days.

(21) Appl. No.: 16/823,554

(22) Filed: Mar. 19, 2020

(65) Prior Publication Data

US 2020/0269541 A1   Aug. 27, 2020

Related U.S. Application Data

(63) Continuation of application No. 15/620,669, filed on Jun. 12, 2017, now Pat. No. 10,632,715.

(51) Int. Cl.
| | |
|---|---|
| *B32B 5/00* | (2006.01) |
| *B32B 37/00* | (2006.01) |
| *B41M 5/00* | (2006.01) |
| *B65D 23/00* | (2006.01) |
| *B32B 7/00* | (2019.01) |

(Continued)

(52) U.S. Cl.
CPC ............... *B32B 5/024* (2013.01); *B32B 7/12* (2013.01); *B32B 29/002* (2013.01); *B32B 37/1018* (2013.01); *B32B 37/12* (2013.01); *B41M 5/035* (2013.01); *B41M 5/42* (2013.01); *B65D 23/085* (2013.01); *B65D 23/0842* (2013.01); *B32B 2439/60* (2013.01); *B41M 5/0358* (2013.01);

(Continued)

(58) Field of Classification Search
None
See application file for complete search history.

(56) References Cited

U.S. PATENT DOCUMENTS 5,308,426 A    5/1994  Claveau
5,679,616 A *  10/1997 Payne ................ B41M 5/38214
                                              503/227

(Continued)

FOREIGN PATENT DOCUMENTS

| CN | 1133921 | 10/1996 |
|---|---|---|
| CN | 1977079 | 6/2007 |

(Continued)

OTHER PUBLICATIONS

US 10,500,813 B2, 12/2019, Circosta (withdrawn)

(Continued)

*Primary Examiner* — Jacob T Minskey
*Assistant Examiner* — Matthew Hoover
(74) *Attorney, Agent, or Firm* — Kilpatrick Townsend & Stockton LLP

(57) ABSTRACT

A sublimation transfer sheet assembly including a first layer and an dye or ink layer positioned on a first side of the first layer. The first layer and the dye or ink layer being positioned such that when the sublimation transfer sheet assembly is wrapped about an object with the dye or ink layer facing the object, a first edge portion of the sublimation transfer sheet assembly is overlapped by a second edge portion of the sublimation transfer sheet assembly, and the first edge portion is interposed between the second edge portion and the object.

15 Claims, 9 Drawing Sheets
(5 of 9 Drawing Sheet(s) Filed in Color)

(51) Int. Cl.
    *B32B 29/00* (2006.01)
    *B32B 5/02* (2006.01)
    *B32B 7/12* (2006.01)
    *B32B 37/10* (2006.01)
    *B32B 37/12* (2006.01)
    *B65D 23/08* (2006.01)
    *B41M 5/035* (2006.01)
    *B41M 5/42* (2006.01)
    *B41M 5/382* (2006.01)

(52) U.S. Cl.
    CPC ......... *B41M 5/382* (2013.01); *B41M 2205/02* (2013.01); *B41M 2205/10* (2013.01)

(56) References Cited

U.S. PATENT DOCUMENTS

| | | | |
|---|---|---|---|
| 5,962,368 A | 10/1999 | Poole | |
| 10,632,715 B2 | 4/2020 | Circosta | |
| 2010/0015368 A1* | 1/2010 | Wang | A47G 23/0216 428/32.87 |

FOREIGN PATENT DOCUMENTS

| | | | |
|---|---|---|---|
| CN | 101992614 | 3/2011 | |
| CN | 102909979 | 2/2013 | |
| CN | 104010826 | 8/2014 | |
| CN | 107554111 | 1/2018 | |
| EP | 0953457 | 11/1999 | |
| EP | 2762325 | 8/2014 | |
| EP | 2762325 | 12/2018 | |
| EP | 2762325 B1 * | 12/2018 | ............ B41M 5/395 |

OTHER PUBLICATIONS

U.S. Appl. No. 15/620,669, "Notice of Allowability", dated Oct. 21, 2019, 3 pages.
U.S. Appl. No. 15/620,669, "Notice of Allowance", dated Sep. 11, 2019, 10 pages.
U.S. Appl. No. 15/620,669, "Notice of Allowance", dated Feb. 18, 2020, 9 pages.
CN201710764157.5, "Office Action", dated Aug. 16, 2019, 13 pages.
EP17180147.5, "Extended European Search Report", dated Feb. 28, 2018, 11 pages.

* cited by examiner

DECORATION BY SUBLIMATION TRANSFER SHEET

RELATED APPLICATION DATA

This application is a continuation of U.S. application Ser. No. 15/620,669, filed Jun. 12, 2017, entitled Perimetric Decoration by Sublimation, allowed, the entirety of which is incorporated herein by reference.

TECHNICAL FIELD

The present disclosure relates to decoration by sublimation where decorations are transferred from a transfer sheet to a surface of an item. More specifically, the disclosure relates to perimetric decoration where a decoration is applied around an entire perimeter of an object.

BACKGROUND

Decoration by sublimation, sometimes dye-diffusion, is a generally known process. In this process, unique sublimation dyes or inks are deposited onto a transfer or release sheet or film, to provide an image on the transfer sheet or film. The transfer sheet or film is such that it will release the dyes or inks onto the surface of an object or substrate during a second step of the process, in which the dyes or inks are sublimated and released from the transfer sheet or film to the surface of the object or substrate.

In order to transfer the image from the transfer sheet or film to the object or substrate, in the second step, the dyes or inks must be subjected to a heat press process that is a combination of time, temperature, and pressure. In this second step, the sublimation dyes are transferred at the molecular level into the object substrate, by sublimation and/or liquification.

When decorations are applied around an entire perimeter of an object there are issues that arise with respect to a seam where the decoration begins and ends. In FIG. 1, there is illustrated a cylindrical object 100 and a transfer sheet 102 partially wrapped around the cylindrical object 100. The thickness of the transfer sheet 102 is exaggerated for ease of understanding. In FIG. 2, there is illustrated a circular cross section of the object 100 in the process of being wrapped by transfer sheet 102. In FIG. 3, the same circular cross section of the object 100 has the transfer sheet 102 wrapped about it to illustrate the location of the resultant seam 104.

It is difficult to minimize the seam 104 by simply using a transfer sheet with exact dimensions because, at least in part, it is impossible to reach a tolerance level of zero in the manufacture of both the object and the transfer sheet. Further, there would have to be a tolerance level of zero in the applicator mechanisms that handle and apply the transfer sheet.

Further, when the transfer sheet has a dimension such that there is an overlap of the edges of the transfer sheet, such as illustrated in FIG. 4, there can be more dye or ink transferred at the seam given the doubling of the quantity of dye and ink at or near the seam. This can result in an extra dark and/or extra wide seam, because the increased amount of dye or ink. This can be seen in FIG. 5, which is a photograph of a bottle 200 with a darker image along a seam 202. The width of the seam 202 is very wide in region 204 at the top of the bottle.

Thus, the resultant seam is nearly always, if not always, visible and provides an undesirable discontinuity in the transferred image.

It also is known that the closeness of the transfer sheet to the object affects the transfer of dyes and inks during the sublimation step. The looser the transfer sheet is held against the object, the greater the distance between the dyes or inks and the surface being decorated. The result is that the droplets of the dyes or inks then have a greater distance over which to expand, and the resultant image becomes blurry.

Referring again to FIG. 4, it can be seen that due to the overlapping end portions 102A and 102B of the transfer sheet 102, a gap 106 will exist at the edge of the overlapped end portion 102A. Thus, the transferred image can be blurry in a region adjacent or near the seam because of the greater distance between end portion 102B and the object 100.

In FIG. 6, it is illustrated how a wrinkle 110 in the transfer sheet 102 can also create a gap 112 between the transfer sheet 102 and the object 100. Such gaps also create blurry regions in the resultant image.

U.S. Pat. No. 5,308,426 notes that decoration of objects of curved, spherical or ovoidal shapes bring about certain drawbacks when positioning a paper transfer sheet. The patent states that these drawbacks essentially reside in the fact that the paper transfer sheet does not properly deform along its principal axes, this creating irregularities in the covering of the object by the paper sheet. The patent goes on to state that such irregularities are due to the fact that the paper sheet creases or crumples when it is positioned in a vacuum around the object to be decorated. Then, at the moment of sublimation, these creases are transferred onto the surface of the object, thus adversely affecting the quality of the drawing reproduced. Such adverse effects include a discontinuity of the decoration or offsetting portions of drawing with respect to one another.

U.S. Pat. No. 5,308,426 describes addressing this problem by enveloping an object in with a transfer sheet made of and air-permeable extendible material, which while deform and conform about the shape of the object.

U.S. Pat. No. 5,962,368 describes use of a heat shrinkable material for the transfer sheet, or as an envelope about an object wrapped with the transfer sheet. The heat shrinkable material is subjected to heat before the second step in order to conform the transfer sheet about the shape of the object, and to place the dyes and inks closer to the surface of the object during the sublimation step.

However, the use of such materials requires the use of special films and the like which typically are more expensive than paper transfer sheets.

The use of paper transfer sheets in particular can give rise to other issues. As noted above, paper transfer sheets are less likely to conform about the shape of an object. Further, they can give rise to greater air gap at the seam because paper is less malleable than plastic.

SUMMARY

The present disclosure describes one or more inventions in which the sublimation of dyes onto an object is enhanced to reduce the visibility of the resultant seam and to reduce blurring in the resultant image on an object.

As used hereinafter, "sublimation transfer sheet" means a combination of a release layer and a dye or ink layer on the release layer. An "ink or dye layer" means a layer on the release sheet that contains inks or dyes deposited on the release layer, typically in the form of an image which is the reverse of the final decoration or image to be formed on an object. A "paper transfer sheet" means a transfer sheet with a paper release layer.

As used herein, a "perimeter" is a continuous or nearly continuous dimension around a cross section of an object. The object may have the same or differently shaped and/or sized perimeters along an axis perpendicular to the respective cross sections.

In an embodiment, a sublimation transfer sheet includes a release layer, a dye or ink layer on one side of the release layer, and a backing layer at a first edge portion of the release layer but on another side of the release layer. The backing layer can be positioned between the release layer and an overlapping second edge portion of the transfer sheet. As a result, the dye or ink on the overlapping second edge portion can be prevented from entering a seam along the first edge portion.

In an embodiment, the release layer is made of paper.

In an embodiment, the backing layer is absorbent.

In an embodiment, the backing layer is made of an absorbent paper.

In an embodiment, the backing layer is made of a woven material which absorbs liquid by means of a capillary effect.

In an embodiment, the backing layer extends from a first edge to a second edge of the release layer.

In an embodiment, the backing layer is secured to the release layer.

In an embodiment, the backing layer is secured to the release layer by an adhesive.

In an embodiment, a sublimation decoration process includes the step of wrapping a sublimation transfer sheet about a perimeter of an object such that a first edge portion of the transfer sheet is overlapped by a second edge portion of the transfer sheet, and the first edge portion includes a backing layer between the first edge portion and dyes or inks on the second edge portion.

In an embodiment, the sublimation decoration process includes placing the backing layer on a side of the release layer.

In an embodiment, the sublimation decoration process includes securing the backing layer onto the side of the release layer.

In an embodiment, the sublimation decoration process includes adhering the backing layer onto the side of the release layer.

In an embodiment, the sublimation decoration process includes fixing the sublimation transfer sheet about the perimeter of the object by means of an vacuum bag.

In an embodiment, the sublimation decoration process includes fixing the sublimation transfer sheet about the perimeter of the object by means of a heat sealable vacuum bag.

In an embodiment, the sublimation decoration process includes evacuating a heat sealable vacuum bag and then heat sealing the heat sealable vacuum bag.

In an embodiment of the sublimation decoration process, the heat sealable vacuum bag is evacuated to a vacuum of at least 28 inches of mercury.

In an embodiment of the sublimation decoration process, the heat sealable vacuum bag can withstand heating at a temperature of up to at least 150 degrees C.

In an embodiment of the sublimation decoration process, the heat sealable vacuum bag can withstand heating at a temperature of up to at least 160 degrees C.

In an embodiment, the disclosure provides an object produced by any of the sublimation decoration processes.

In an embodiment, the object is a bottle.

In an embodiment, the object is a metallic bottle.

These and other embodiments are discussed below in greater detail with reference to the accompanying drawings.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

DETAILED DESCRIPTION

Generally the invention or inventions disclosed herein improve the transfer of sublimation dyes or inks from a transfer sheet about a perimeter of a surface of an object, by reducing transfer of ink or dye from an overlapping end portion of a sublimation transfer sheet to the object thereby reducing visibility of any seam, and reducing blurring of the resultant image on the surface of the object.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Various terminology used herein is for describing particular embodiments and is not intended to be necessarily limiting of this disclosure. As used herein, various singular forms "a," "an" and "the" are intended to include various plural forms as well, unless a context clearly indicates otherwise. Various terms "comprises," "includes" and/or "comprising," "including" when used in this specification, specify a presence of stated features, integers, steps, operations, elements, and/or components, but do not preclude the presence and/or addition of one or more other features, integers, steps, operations, elements, components, and/or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

Figure 7:
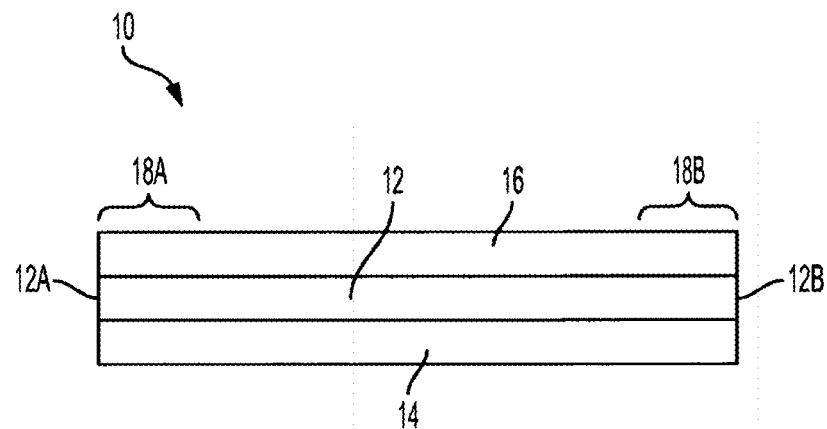
FIG. 7 illustrates in cross section a first sublimation transfer sheet embodying principles disclosed herein.

In FIG. 7, there is illustrated in cross section a first embodiment of a sublimation transfer sheet 10 embodying principles disclosed herein. The sublimation transfer sheet 10 includes a release layer 12 with a first edge 12A and a second edge 12B, an ink or dye layer 14 on a first side of the release layer 12, and a backing layer 16 on a second side of the release layer. The backing layer 16 extends from the first edge 12A of the release layer 12 to the second edge 12B of the release layer 12. Overall, the sublimation transfer sheet 10 includes a first end portion 18A and a second end portion 18B.

As can be appreciated, in plan view (not illustrated) the sublimation transfer sheet 10 can have any suitable shape. Preferable it is rectangular in shape.

In accordance with principles disclosed herein, the backing layer is included so that when the sublimation transfer sheet is wrapped around the perimeter of an object, and the end portions 18A and 18B overlap, the backing layer will reduce, if not prevent, the ink or dye on the overlapping end portion from reaching the object. This then reduces the visibility of the resultant seam because the reduction of ink or dye avoids widening and darkening of the seam.

The release layer 12 can be of any suitable material, but preferably is a paper sheet. Such sheets are commercially available and widely known.

The backing layer 16 can be of any suitable material that is absorbent or impermeable. Preferably the backing layer is made of a woven material that absorbs the ink or dye via capillary action. More preferably the backing layer 16 is made of an absorbent paper. Yet more preferably, the backing layer 16 is made an ordinary 2-ply paper towel such as those the can be purchased at retail in a supermarket. Examples include Bounty brand, Viva brand, and Brawny brand towels, which are sold in rolls.

While it is not necessary to secure the backing layer 16 to the release layer 12, it is preferred that it is secured so that that are more easily held together during the heat press process. In that regard, preferably the backing layer 16 is secured to the release layer 12 by means of an adhesive. Preferably the adhesive is applied in aerosol form.

Figure 8:
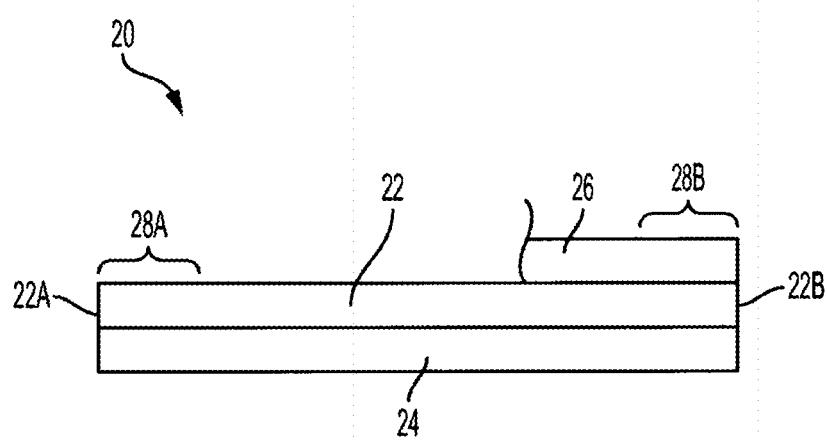
FIG. 8 illustrates in cross section a second sublimation transfer sheet embodying principles disclosed herein.

In FIG. 8, there is illustrated a second sublimation transfer sheet 20 embodying principles disclosed herein. The sublimation transfer sheet 20 includes a release layer 22 with a first edge 22A and a second edge 22B, an ink or dye layer 24 on a first side of the release layer 22, and a backing layer 26 on a second side of the release layer. Overall, the sublimation transfer sheet 20 includes a first end portion 28A and a second end portion 28B.

As can be appreciated, in plan view (not illustrated) the sublimation transfer sheet 20 can have any suitable shape. Preferable it is rectangular in shape.

In this embodiment, the backing layer 26 extends only from the second edge 22B to a distance sufficient to be in a region where the ends portions 28A and 28B overlap when the sublimation transfer sheet is wrapped around the perimeter of an object to be decorated.

The release layer 22 can be of any suitable material, but preferably is a paper sheet. Such sheets are commercially available and widely known.

The backing layer 26 can be of any suitable material that is absorbent or impermeable. Preferably the backing layer is made of a woven material that absorbs the ink or dye via capillary action. More preferably the backing layer 16 is made of an absorbent paper. Yet more preferably, the backing layer 26 is made of ordinary 2-ply paper towel material such as that which can be purchased at retail in a supermarket, or their equivalent sold for industrial use. Examples include Bounty brand, Viva brand, and Brawny brand paper towels, which are sold in rolls.

While it is not necessary to secure the backing layer 26 to the release layer 22, it is preferred that it is secured so that that are more easily held together during the heat press process. In that regards, preferably the backing layer 16 is secured to the release layer 22 by means of an adhesive. Preferably the adhesive is applied in aerosol form.

Figure 9:
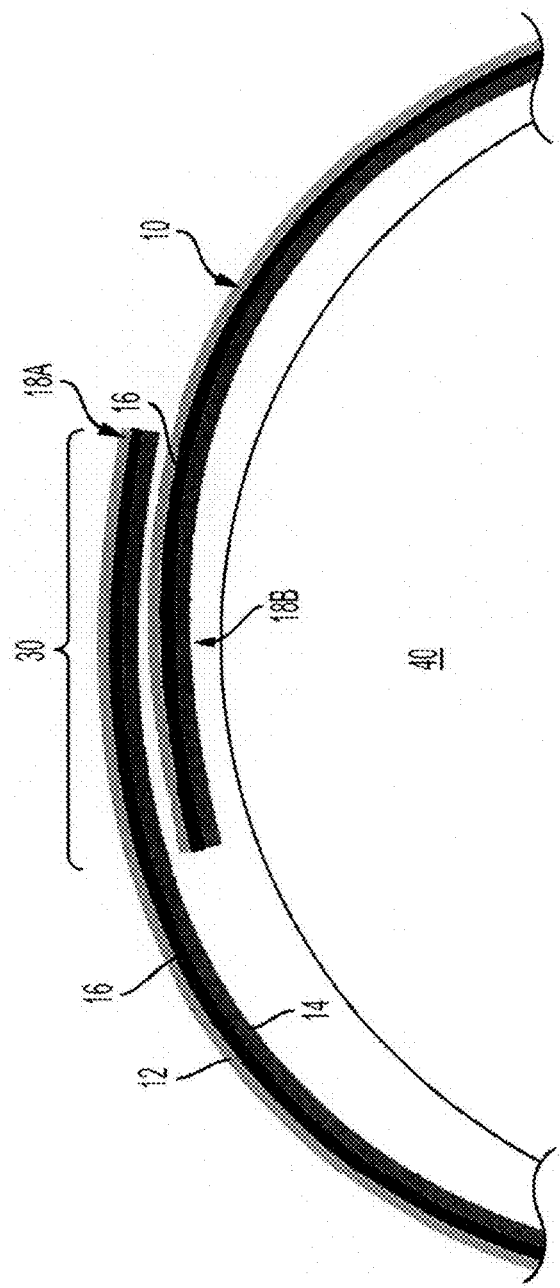
FIG. 9 illustrates a section of a perimeter of an object with a section of sublimation transfer sheet embodying principles of the invention with overlapping edge portions.

In FIG. 9, there is illustrated in cross section an object 40 with the sublimation transfer sheet 10 loosely wrapped around a perimeter of 42 of the object 40. As can be seen, there is a region 30 of overlap between the first end portion 18A and second end portion 18B. In the overlap region 30, the backing layer 16 is between the ink or dye layer 14 of first end portion 18A and the second end portion 18B. When the sublimation transfer sheet 10 is subjected to the heat press process, the backing layer will prevent or minimize the ink or dye in the end portion 18A from reaching the object 40. If the backing layer 16 is absorbent it will absorb the excess ink or dye.

As can be appreciated, there are several steps that can be undertaken in accordance with principles disclosed herein to decorate an object using a sublimation transfer process. There are steps for the preparation of the sublimation transfer sheet and steps for the wrapping of the sublimation transfer sheet around the perimeter of the object.

The sublimation transfer sheet can be prepared by securing the backing layer to the release layer before or after the ink or dye layer has been printed onto the release layer. To do so, an adhesive, preferably in aerosol form, is deposited on the release layer. Then, the backing layer is attached to the release layer. If the backing layer is of a size or shape different than that of the release layer, preferably the backing layer is trimmed to the perimeter of the release layer.

The wrapping process preferably involves first wrapping the object with the sublimation transfer sheet with the ink or dye layer facing the object. The sublimation transfer sheet is of such a dimension between two edges of the release layer that two end portions of the sublimation transfer sheet will overlap along a perimeter of the object, as viewed in cross section, such as illustrated in FIG. 9. That is to say, the sublimation transfer sheet is longer the distance of the perimeter. It may be necessary or helpful to secure the sublimation transfer sheet about the object by means of a string wrapped about the object or one or more strips of adhesive tape.

Thereafter, the wrapped object is place within a vacuum bag, preferably a heat sealable vacuum bag. The atmosphere in the bag is then evacuated, and the bag sealed. As can be appreciated, the evacuated vacuum bag will keep the sublimation transfer sheet tightly wrapped about the object.

The wrapped and sealed object is then subjected to a heat press process suitable for sublimating and transferring the ink or dye to the object. As can be appreciated, the vacuum bag will need to withstand the temperatures of the heat press process. The wrapped and sealed object preferably is subjected to the heat press process until ink or dye is well visible in the backing layer.

Figure 10:
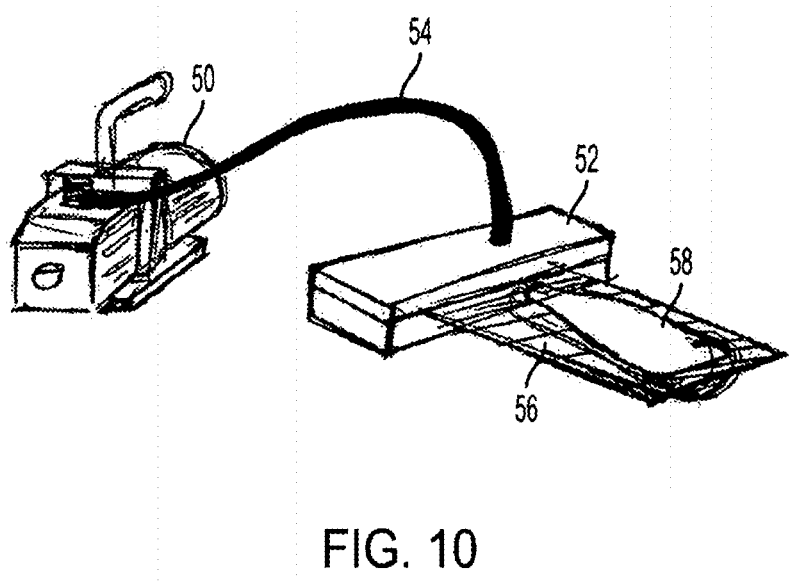
FIG. 10 illustrates an arrangement for sealing a sublimation transfer sheet wrapped object within an evacuated and sealed heat sealable vacuum bag.

In accordance with principles disclosed herein, one suitable arrangement for evacuating and sealing the vacuum bag is illustrated in FIG. 10. In FIG. 10, there is illustrated a high strength vacuum pump 50 capable of creating a vacuum of at least 28 in. Hg (711.2 Torr), and more preferably 29 in. Hg (735 Torr); a heat sealer 52; and a hose 54 between the heat sealer 52 and the vacuum pump 50. Such heat sealers are commercially available. The hose preferably is of sufficient strength such as a nylon hose. The heat sealer 52 preferably can be switched on and off such that the vacuum bag can be evacuated before being heat sealed.

In FIG. 10, a vacuum bag 54 with a wrapped object 56 is shown with an open end of the bag in the position for evacuation and sealing of the bag.

In accordance with principles disclosed herein, the foregoing processes and steps are beneficially applied to the decoration of metal bottles. The bottles are wrapped about their longitudinal axes. Excess sublimation transfer sheet is folded about the bottoms. Caps are loosely fitted on the bottle openings to prevent ingress of material into the bottles. The heat sealable vacuum bags preferably are capable of withstanding temperatures of up to at least 150 degrees C., and more preferably up to at least 160 degrees C.

Figure 1:
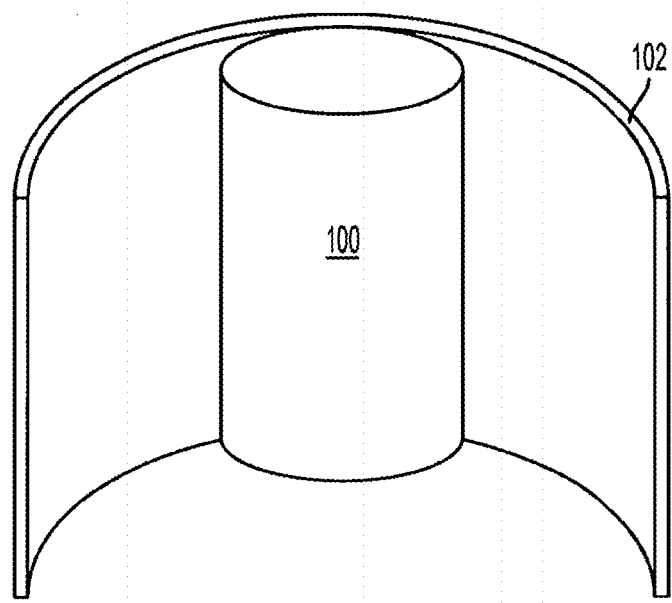
FIG. 1 illustrates in perspective view a cylindrical object and a sublimation transfer sheet partially wrapped around the object.
Figure 2:
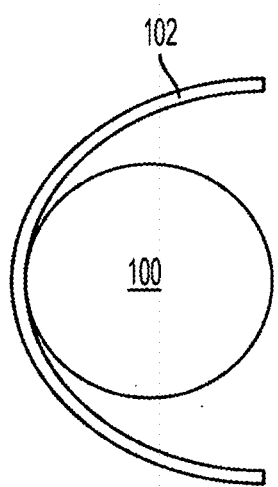
FIG. 2 illustrates a cross section of the cylindrical object of FIG. 1 with the sublimation transfer sheet partially wrapped around a perimeter of the cylindrical object.
Figure 3:
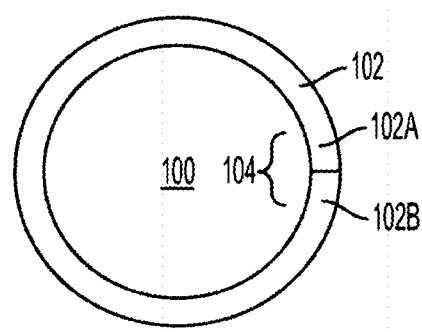
FIG. 3 illustrates the cross section of the cylindrical object of FIGS. 1 and 2 with sublimation transfer sheet wrapped around the perimeter of the cylindrical object, but without overlapping edge portions of the sublimation transfer sheet.
Figure 4:
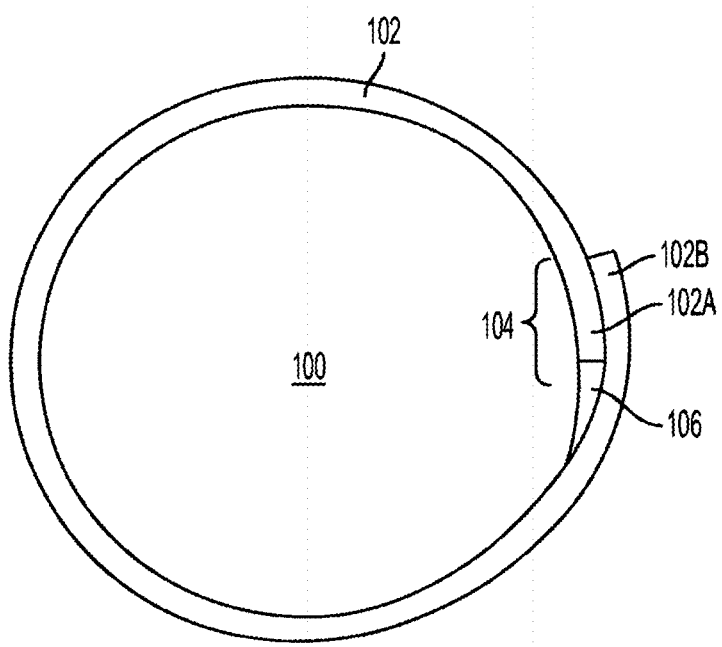
FIG. 4 illustrates in cross section the cylindrical object with the sublimation transfer sheet wrapped around a perimeter of the cylindrical object, but with overlapping end portions of the sublimation transfer sheet.
Figure 5:
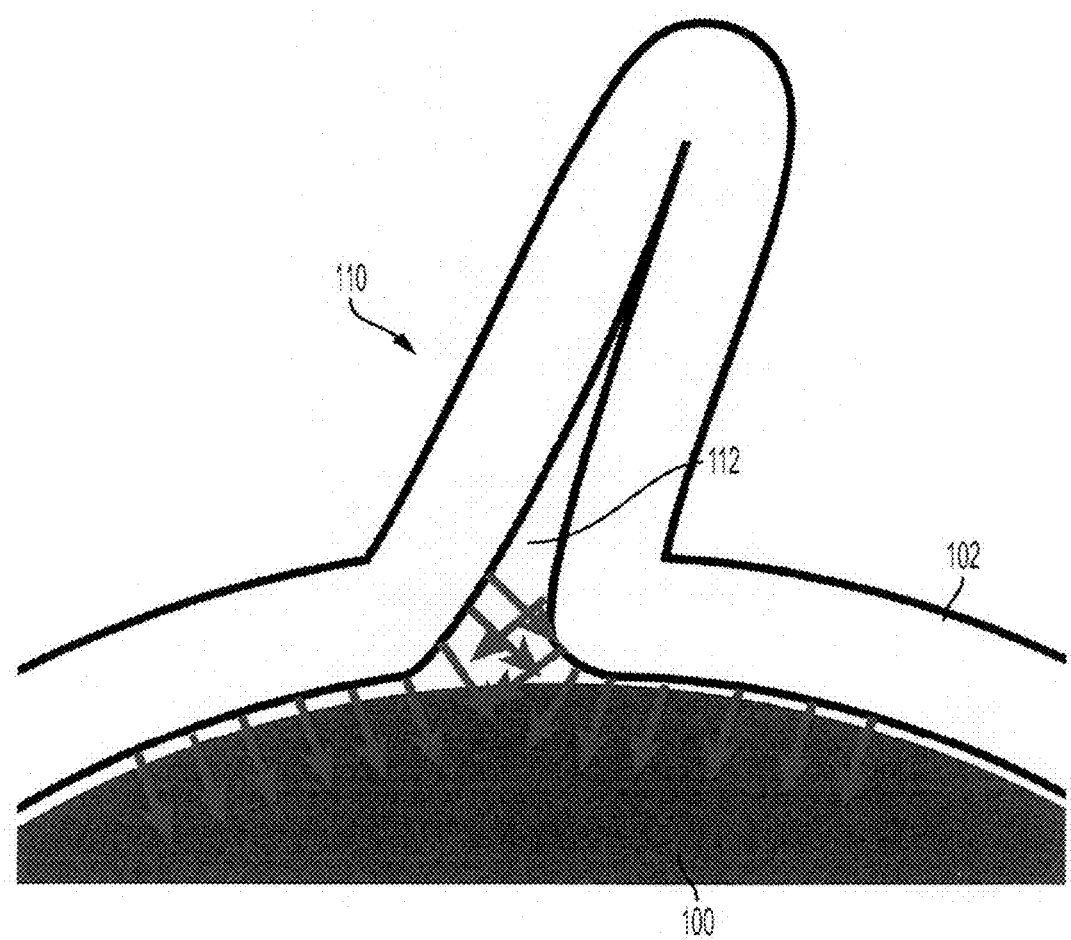
FIG. 5 illustrates a bottle with a visible seam resulting from the an overlap of end portions of a sublimation transfer sheet.
Figure 6:
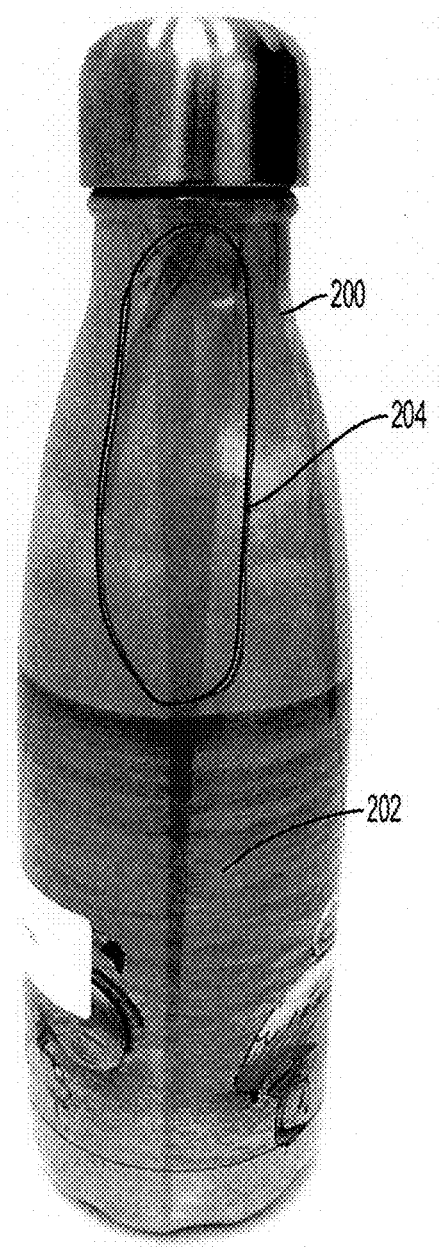
FIG. 6 illustrates in cross section a section of yet another cylindrical object with section of yet another sublimation transfer sheet with a wrinkle.
Figure 11:
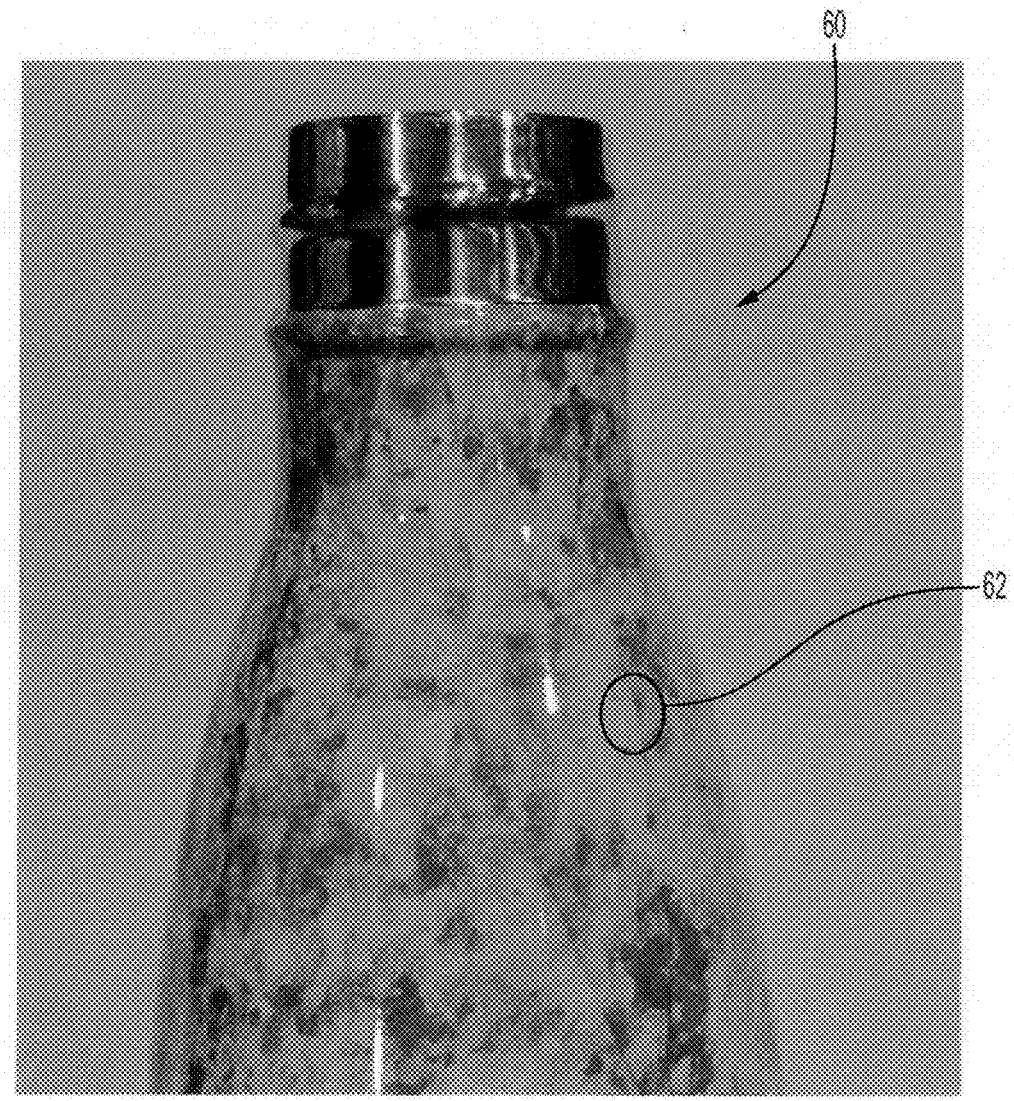
FIG. 11 illustrates a portion of a first bottle decorated in accordance with principles disclosed herein.
Figure 12:
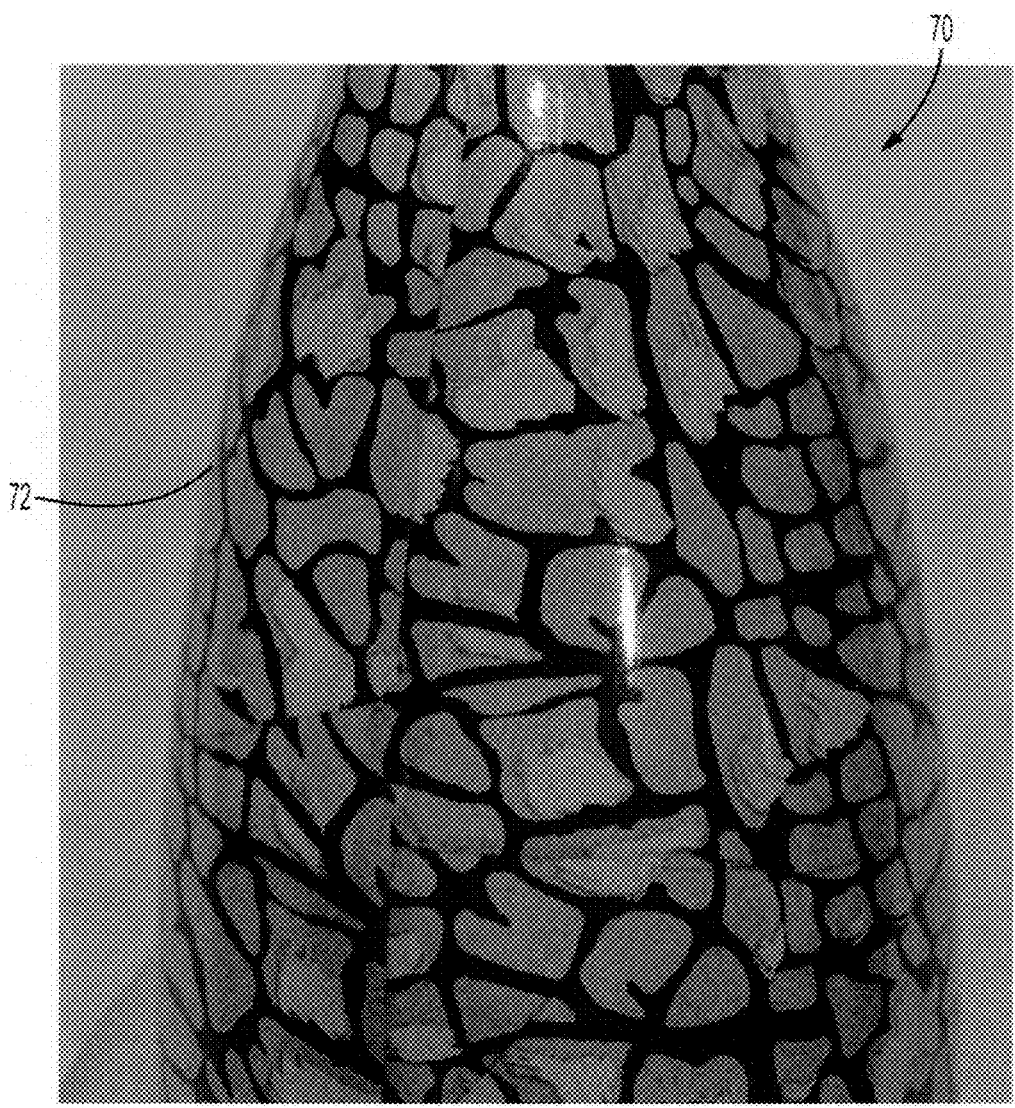
FIG. 12 illustrates portion of a second bottle decorated in accordance with principles disclosed herein.

In FIGS. 11 and 12, there are photographs of metallic bottles decorated in accordance with the principles disclosed herein. As can be seen in FIG. 11, the decoration on bottle 60 is sharp and clear, and without regions of blurs. Further, the seam 62 is barely visible on the right side of the bottle. In FIG. 12, the decoration on the bottle 70 is similarly sharp and clear and without blurs. If it weren't for the contrasting colors along the seam 72, the seam would not be discernible. That is to say, because the seam can be seam where the colors are different on opposite sides of the seam, it makes it easy to see the seam in those regions where the colors are the same on the opposite sides of the seam. In any event, the resulting decorations are vastly different and improved over that shown in FIG. 6, and despite using a transfer sheet with a paper release layer.

As an alternative to the backing layer, a release layer could be made sufficiently thick and absorbent, or more impermeable, to achieve the same result. In such case, the release layer would have the backing layer qualities that enable the release layer to also function as the backing layer. In that regard, a thicker absorbent release layer would be able to absorb the inks or dyes from the overlapping end portion of the sublimation transfer sheet in an out region of the release layer. Current industry standard paper transfer sheets are inadequate because, in part, they are too thin.

Embodiments of this disclosure are described herein with reference to illustrations of idealized embodiments (and intermediate structures) of this disclosure. As such, variations from various illustrated shapes as a result, for example, of manufacturing techniques and/or tolerances, are to be expected. Thus, various embodiments of this disclosure should not be construed as necessarily limited to various particular shapes of regions illustrated herein, but are to include deviations in shapes that result, for example, from manufacturing.

Unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized and/or overly formal sense unless expressly so defined herein.

Furthermore, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various terms "below" and "lower" can encompass both an orientation of above and below.

As used herein, a term "about" and/or "substantially" refers to a +/−10% variation from a nominal value/term. Such variation is always included in any given value/term provided herein, whether or not such variation is specifically referred thereto.

If any disclosures are incorporated herein by reference and such disclosures conflict in part and/or in whole with this disclosure, then to an extent of a conflict, if any, and/or a broader disclosure, and/or broader definition of terms, this disclosure controls. If such disclosures conflict in part and/or in whole with one another, then to an extent of a conflict, if any, a later-dated disclosure controls.

This detailed description has been presented for various purposes of illustration and description, but is not intended to be fully exhaustive and/or limited to this disclosure in various forms disclosed. Many modifications and variations in techniques and structures will be apparent to skilled artisans, without departing from a scope and spirit of this disclosure as set forth in various claims that follow. Accordingly, such modifications and variations are contemplated as being a part of this disclosure. A scope of this disclosure is defined by various claims, which include known equivalents and unforeseeable equivalents at a time of filing of this disclosure.

What is claimed is:

1. A sublimation transfer sheet assembly comprising:
   a first layer; and
   a dye or ink layer positioned on a first side of the first layer,
   wherein the first layer and the dye or ink layer are positioned such that when the sublimation transfer sheet assembly is wrapped about an object with the dye or ink layer facing the object, a first edge portion of the sublimation transfer sheet assembly is overlapped by a second edge portion of the sublimation transfer sheet assembly, and the first edge portion is interposed between the second edge portion and the object.

2. The sublimation transfer sheet assembly of claim 1, further comprising a backing layer adjacent a second side of the first layer opposite the dye or ink layer.

3. The sublimation transfer sheet assembly of claim 2, wherein the backing layer is configured to absorb a portion of the dye or ink layer of the second edge portion.

4. The sublimation transfer sheet assembly of claim 2, wherein the backing layer comprises an absorbent paper.

5. The sublimation transfer sheet assembly of claim 2, wherein the backing layer comprises a woven material.

6. The sublimation transfer sheet assembly of claim 2, wherein the backing layer extends from a first edge to an opposing second edge of the first layer.

7. The sublimation transfer sheet assembly of claim 2, wherein the backing layer is secured to the first layer.

8. The sublimation transfer sheet assembly of claim 7, wherein the backing layer is secured to the first layer by an adhesive.

9. A sublimation transfer sheet assembly comprising:
a first layer;
a dye or ink layer positioned on a first side of the first layer; and
an absorbent backing layer adjacent a second side of the first layer opposite the dye or ink layer,
wherein, when a first edge of the sublimation transfer sheet assembly overlaps an opposing second edge of the sublimation transfer sheet assembly such that the absorbent backing layer of the opposing second edge is positioned between the first layer of the opposing second edge and the dye or ink layer of the first edge, the absorbent backing layer is configured to absorb at least a portion of the dye or ink layer of the first edge.

10. The sublimation transfer sheet assembly of claim 9, wherein the absorbent backing layer comprises an absorbent paper.

11. The sublimation transfer sheet assembly of claim 9, wherein the absorbent backing layer comprises a woven material.

12. The sublimation transfer sheet assembly of claim 9, wherein the absorbent backing layer extends from the first edge of the sublimation transfer sheet assembly to the opposing second edge of the sublimation transfer sheet assembly.

13. The sublimation transfer sheet assembly of claim 9, wherein the absorbent backing layer is secured to the first layer.

14. The sublimation transfer sheet assembly of claim 13, wherein the absorbent backing layer is secured to the first layer by an adhesive.

15. The sublimation transfer sheet assembly of claim 9, wherein the absorbent backing layer comprises paper.

\* \* \* \* \*